May 1, 1934.  W. E. STRAIT  1,956,881
COIL
Filed Oct. 7, 1931

Inventor
Wilber E. Strait.
By his Attorneys

Patented May 1, 1934

1,956,881

UNITED STATES PATENT OFFICE 1,956,881

COIL

Wilber E. Strait, Fort Wayne, Ind., assignor to General Cable Corporation, New York, N. Y., a corporation of New Jersey Application October 7, 1931, Serial No. 567,346

4 Claims. (Cl. 175—21)

This invention relates to electrical coil structures and to a method of assembling such coil structures. Among the objects of the invention are the provision of an improved coil and of an improved method of assembling a coil. Other objects and advantages of the invention will appear hereinafter.

Figure 1:
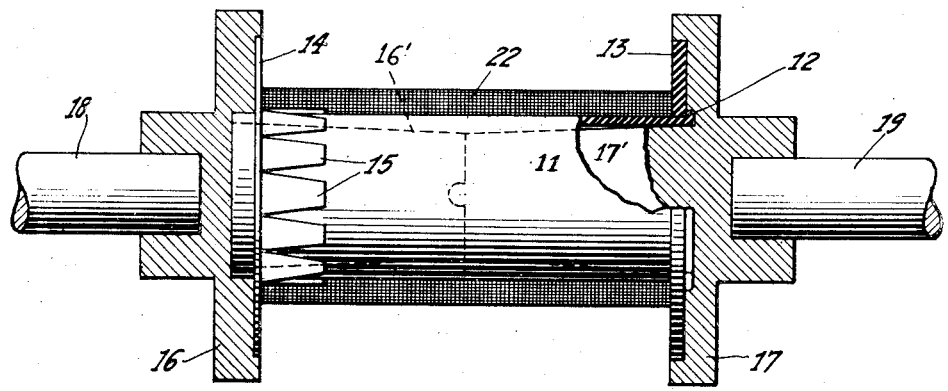
Figure 2:
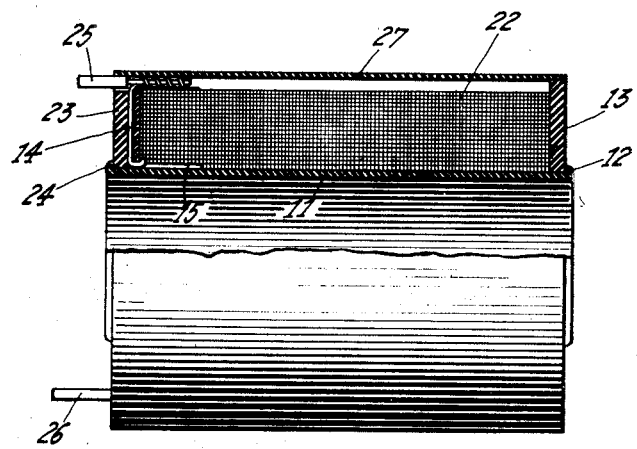

The nature and objects of the invention will be better understood from a description of a particular illustrative embodiment thereof, and for the purpose of such description reference should be had to the accompanying drawing forming a part hereof, and in which:

Fig. 1 is a view largely in section of a partially assembled coil mounted on a winding mandrel; and Fig. 2 is an elevation of a complete coil structure, a portion of the coil being broken away to provide a longitudinal sectional view.

In winding certain types of electrical coils, and more particularly certain types of fine wire electrical coils, it is customary to wind the wire in a plurality of overlying layers on a spool or bobbin, usually of insulating material. In coils of this type the spool serves as a support to preserve the shape of the coil during the coil finishing operations and during shipment and installation, and also to protect, at least to a limited extent, the turns of the coil during these operations against physical injury which might affect the electrical characteristics of the coil or injure it beyond repair.

After the coil has been wound on the spool the end of the winding is anchored, and the terminal leads are attached to the ends of the coil winding. The end of the coil winding and the terminal leads commonly are anchored or secured to the coil by means of stickers or tapes, and if the end flanges of the spool are flexible the same stickers or tapes, or additional securing means, secure the end flanges in place against the ends of the coil winding. The outer surface of the coil then is covered with suitable insulating material, ordinarily by wrapping on paper or varnished cloth.

Coils as thus described may prove serviceable and satisfactory in operation, but are expensive and require considerable care in manufacture, handling and installing to prevent damage to the coil winding. The means securing the terminal leads and end flanges may become displaced, the end flanges may move or bend permitting the end turns of the coil winding to slip, or the turns of the winding may be broken or otherwise damaged. Furthermore, such coils exhibit an untoward appearance because of the stickers and tapes used in securing the terminals and the end flanges, and the outer surfaces of the coils are irregular and vary slightly in dimensions.

According to this invention a coil structure is provided in which the coil winding is completely protected against injury, in which the dimensions of each similar coil structure are the same, in which the coils are adequately insulated electrically without provision of the usual external insulating wrappings, and in which the appearance of the coil structure is materially improved. Handling of the coils is expedited, and the possibility of injury is greatly reduced. The invention is applicable, among other adaptations, to field coils for electro-dynamic sound reproducers.

Referring to the drawing, and first to Fig. 1, the spool upon which the coil of the illustrative embodiment is wound comprises a rigid cylindrical tube 11, conveniently of insulating material. At the right hand end the tube 11 is burred outwardly at 12 to provide a stop for the stiff end flange 13, preferably of insulating material. On the tubular support 11, adjacent but spaced slightly inwardly from the other end thereof, is an end flange 14. Conveniently the end flange 14 may be formed from a somewhat flexible sheet of insulating material, and is provided along its inner edge with angularly bent tongues 15 projecting inwardly along and lightly gripping the tubular support 11. The end flanges 13 and 14 are positioned on the tubular support 11, and the tubular support is then placed on a suitable winding arbor.

As shown in Fig. 1, the arbor comprises two end plates 16 and 17 secured on the ends of the shafts 18 and 19, which shafts are mounted in suitable bearings, (not shown) and to one of which may be connected suitable means, (not shown) for rotating the arbor. The end plates 16 and 17 are recessed on their inner faces to receive the ends of the tubular support 11 extending beyond the flanges 14 and 13, and also to receive the flanges 14 and 13 substantially flush with the inner faces of the end plates 16 and 17. The end plates 16 and 17 also are provided with interlocking hubs 16' and 17' frictionally engaging the inner surface of the tubular support 11 to hold the support 11 and prevent relative turning movement between the spool and arbor, as well as to prevent relative turning movement between the two end plates.

After the spool has been assembled on the arbor, a short length of the wire from which the coil is to be wound is drawn through between the tubular support 11 and the inner edge of the end flange 14, and is wound around the tubular support between the flange 14 and the end plate 16 to provide a lead for the terminal to the inner end of the coil. The flange 14 is then moved outwardly along the tubular support 11 until it enters the recess in the plate 16, and the end flange 13 is moved along the support 11 into the recess in the plate 17. The arbor then is rotated and the wire is wound on the spool between the end flanges in a plurality of overlying layers, forming the coil winding 22. When the coil winding is completed, the wire is severed, and the end of the winding is secured in place, as by means of a sticker or tape.

The coil structure then is removed from the arbor, and a stiff end flange 23 is positioned on the end of the support 11 adjacent the flange 14 to overlie and protect the several turns of wire providing a lead for the inner end of the coil. The end flange 23 is pressed firmly against these turns of wire and the flange 14, and the end of the tubular support 11 is burred outwardly at 24 to secure the flange 23 permanently in position. The lead for the inner coil terminal extends outwardly between the flanges 14 and 23, beyond the periphery thereof, and includes several additional turns of wire which may readily be withdrawn to provide an inner lead for the coil in case of breakage of that portion of the wire extending beyond the edge of the flanges.

The coil terminals 25 and 26 are then attached to the coil leads and secured on the outer surface of the coil, as by means of patches. After the terminals have been attached, an outer cylindrical covering 27 is applied. Desirably this covering 27 closely engages the peripheries of the end flanges 13 and 23 so as to substantially complete and seal the insulating jacket surrounding the coil winding. This cylindrical covering 27 may be a multiple layer wrapping of paper or fibre.

The assembled coil structure then is subjected to a suitable finishing treatment with an insulating composition, for example paraffine, which completely seals the coil winding, and which, if desired, may fill the annular space between the coil winding 22 and the cylindrical covering 27.

It will be seen that applicant has provided an improved coil structure in which the coil winding is completely enclosed and is protected against moisture and gas as well as against mechanical injury. The usual unsightly, external insulating wrappings are eliminated, and all of the coils are of uniform appearance and size. A simplified and improved method of assembly also is provided.

The foregoing description of an embodiment of the invention is illustrative merely, and is not intended to define the limits of the invention.

I claim:

1. An electrical coil structure comprising, in combination, a tubular winding support having one end burred outwardly, a stiff end flange positioned on said tubular support against said burred end, a relatively flexible end flange adjacent but spaced slightly inwardly from the other end of said tubular support, a coil winding comprising a plurality of overlying layers of wire wound on said tubular support between said end flanges and permanently securing said flexible end flange in position, a second stiff end flange on said tubular support adjacent said flexible end flange, the adjacent end of the tubular support being burred outwardly to retain said last-mentioned end flange in position, and an inner lead from said coil winding passing through said flexible end flange and thence outwardly between said flexible end flange and the adjacent stiff end flange.

2. An electrical coil structure comprising, in combination, a winding support, a coil winding including a plurality of overlying layers of wire wound on said support, an end supporting construction for said coil winding comprising two adjacent end flanges which are firmly pressed together at their inner edges and which are unconnected at their outer edges, one of said flanges being relatively flexible, and an inner lead from said coil winding extending outwardly of the coil structure between said adjacent flanges and frictionally held thereby.

3. An electrical coil structure according to claim 2, characterized by the fact that said inner lead is longer than the radial distance to the outer periphery of the end flange, and that the lead follows a spiral path outwardly between the flanges.

4. An electrical coil structure comprising, in combination, a winding support, a coil winding on said support, end flanges secured on said support adjacent its ends and supporting the ends of the coil winding, a relatively flexible flange on said support intermediate the coil winding and one of said end flanges, said relatively flexible flange being movable freely along said support prior to the winding operation and firmly held between the coil winding and the adjacent end flange in the finished coil, and a lead from an inner portion of the coil winding extending through the relatively flexible flange and spirally outwardly between the relatively flexible flange and the adjacent end flange, said spiraled lead being frictionally held by the closely pressed flanges.

WILBER E. STRAIT.